(12) United States Patent
Moore et al.

(10) Patent No.: US 7,623,962 B1
(45) Date of Patent: Nov. 24, 2009

(54) NAVIGATION DEVICE WITH IMPROVED DETOUR ROUTING

(75) Inventors: Scott T. Moore, Olathe, KS (US); Ryan T. Moore, Overland Park, KS (US); Thomas I. Loschen, Olathe, KS (US)

(73) Assignee: Garmin Ltd. (KY)

( * ) Notice: Subject to any disclaimer, the term of this patent is extended or adjusted under 35 U.S.C. 154(b) by 833 days.

(21) Appl. No.: 11/218,909

(22) Filed: Sep. 2, 2005

(51) Int. Cl.
*G01C 21/00* (2006.01)

(52) U.S. Cl. ....................................... 701/210

(58) Field of Classification Search ......... 701/200–202, 701/208, 210, 213–215; 340/988, 995.1; 342/357.06
See application file for complete search history.

(56) References Cited

U.S. PATENT DOCUMENTS 5,220,507 A * 6/1993 Kirson ........................ 701/202
5,787,383 A * 7/1998 Moroto et al. ............... 701/210
6,687,615 B1   2/2004 Krull et al. .................. 701/210

OTHER PUBLICATIONS

Garmin's StreetPilot 2620 Owner's Manual, Apr. 2004.
TomTom Go CNET Review, published Jul. 25, 2004.
TomTom Go Press Release, published Mar. 18, 2004.
TomTom Go User Guide, published 2004.

* cited by examiner

*Primary Examiner*—Yonel Beaulieu
(74) *Attorney, Agent, or Firm*—Samuel M. Korte

(57) ABSTRACT

A navigation device with improved detour routing is disclosed. The navigation device is generally operable to calculate a first route to a destination utilizing a current location of the navigation device, receive a detour request from a user provided by the user functioning a single detour input once, and calculate a second detour route to the destination in response to the detour request. Such a configuration enables the user to easily and safely request additional route calculations to provide a detour around undesirable travel conditions without requiring extensive user input.

14 Claims, 2 Drawing Sheets

NAVIGATION DEVICE WITH IMPROVED DETOUR ROUTING

BACKGROUND OF THE INVENTION

1. Field of the Invention

The present invention relates to navigation devices. More particularly, the invention relates to a navigation device with improved detour routing operable to calculate a detour route without requiring extensive user input.

2. Description of the Related Art

Navigation devices are becoming increasingly popular due to their many beneficial features. For example, navigation devices commonly utilize the Global Positioning System (GPS) to calculate an accurate current geographic location based on received GPS signals. Due to this ability, navigation devices are commonly utilized by users in innumerable situations, including walking, exercising, biking, driving, boating, flying, etc.

Another beneficial feature many navigation devices provide is the ability to calculate a route from a current location to a destination. For example, a user may provide a navigation device with a desired destination and the navigation device may calculate the most expedient route to the desired destination through various thoroughfares. Such functionality enables users to quickly travel between destinations without requiring specific knowledge of routes or thoroughfares.

Unfortunately, calculated routes often cannot be followed due to the presence of dynamic travel conditions on the calculated route. For instance, accidents, road construction, traffic, weather, and other travel conditions on calculated routes often render the calculated routes undesirable for travel.

Existing navigation devices attempt to remedy the problems presented by dynamic route travel conditions by allowing users to program the navigation device to provide an alternate route. For example, if a user encounters a dynamic travel condition while on a calculated route, the user may program the navigation device to calculate a second detour route around the travel condition. Such programming generally requires the user to manually identify alternate routes, identify the length or distance of the delay, or otherwise function several inputs to provide sufficiently detailed information to the navigation device. As a result of the detailed instructions required to request an alternate route, users often elect to forgo additional route calculations due to safety and time concerns related to the complicated programming of a navigation device while in transit.

SUMMARY OF THE INVENTION

The present invention solves the above-described problems and provides a distinct advance in the art of navigation devices. More particularly, the invention provides a navigation device with improved detour routing operable to calculate a detour route without requiring extensive user input. Such a configuration enables a user to easily and safely request additional route calculations to provide a detour around undesirable travel conditions.

In one embodiment, the navigation device generally includes a processor and a single detour input coupled with the processor. The processor is operable to receive a destination, calculate a first route to the destination utilizing a current geographic location of the device and the destination, and calculate a second detour route to the destination. The single detour input is operable to provide a detour request to trigger the processor to calculate the second detour route when functioned once by a user.

In another embodiment, the navigation device generally includes processor, a location determining component, a user interface, a depressible single detour input, a memory, and a display. The processor is generally operable to determine a current geographic location of the device through coupling with the location determining component, receive a destination from the user interface, calculate a first route to the destination, and calculate a second detour route to the destination. The depressible single detour input is operable to provide a detour request to trigger the processor to calculate the second detour route when depressed once by a user.

In another embodiment, the invention provides a method of providing a route in response to a detour request. The method generally includes receiving a destination; calculating a first route to the destination; receiving a detour request from a user, wherein the detour request consists of the user functioning a single detour input once; and calculating a second detour route to the destination in response to the detour request.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
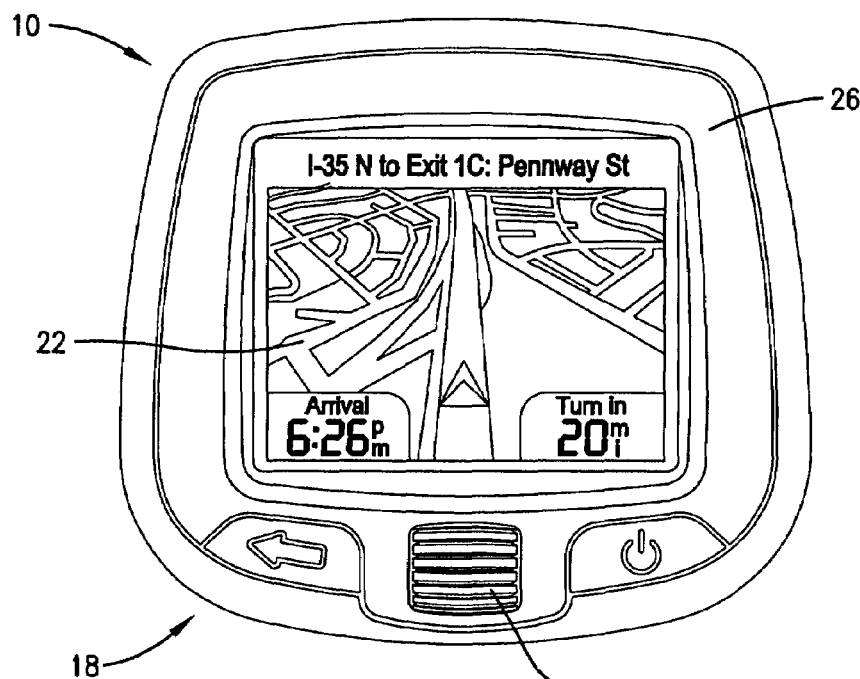
FIG. 1 is a front view of a navigation device configured in accordance with various preferred embodiments of the present invention.
Figure 2:
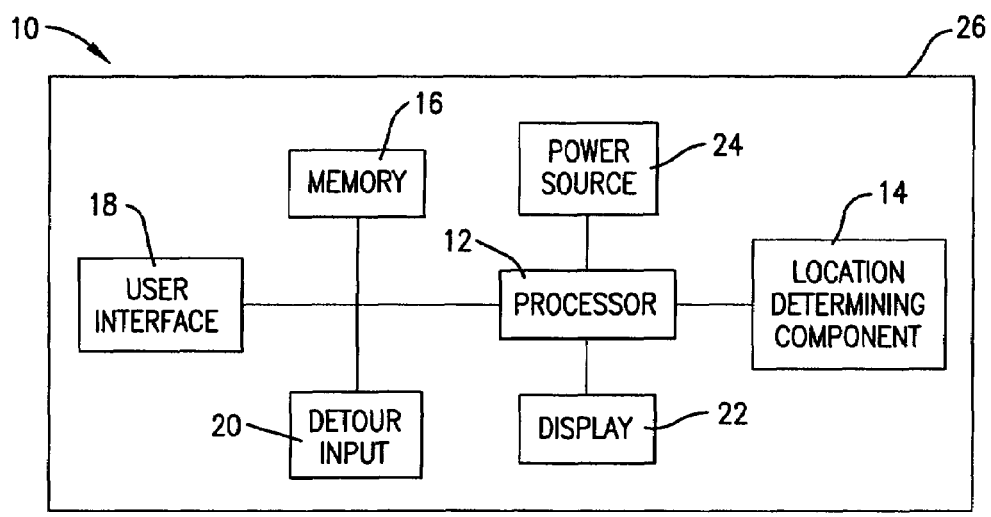
FIG. 2 is a block diagram of the navigation device of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

As shown in FIGS. 1-5, the present invention is preferably implemented utilizing a navigation device 10. The device 10 may be any device operable to provide navigation information to a user. Thus, the device 10 may include computers, televisions, radios, portable computing devices such as laptops or PDAs, cellular telephones, etc. Preferably, the device 10 is an automobile-mounted navigation device manufactured by GARMIN INTERNATIONAL INC. of Olathe, Kans. However, the device 10 may be any device configured as described herein.

The device 10 preferably includes a processor 12, a location determining component 14 coupled with the processor 12 to facilitate determination of a current geographic location, a memory 16 coupled with the processor 12 and operable to store navigation information, a user interface 18 coupled with the processor 12 and operable to communicate with a user, a single detour input 20 coupled with the processor 12 to provide a detour request, a display 22 and power source 24 each coupled with the processor 12, and a housing 26 for housing various device 10 elements.

The processor 12 is preferably coupled with the various device 10 elements including the user interface 18, detour input 20, location determining component 14, memory 16, and display 22, through wired or wireless connections, such as a data bus, to enable information to be exchanged between the various elements. Further, the processor 12 is preferably operable to control the various functions of the device 10 according to a computer program or other instructions associated with the memory 16 or with various processor logic and structure. Also, the processor 12 may comprise various computing elements, such as integrated circuits, microcontrollers, microprocessors, programmable logic devices, etc, alone or in combination to perform the operations described herein.

As described in more detail below, the processor 12 may determine a geographic location of the device 10 by receiving the geographic location from the location determining component 14 or the processor 12 may independently determine geographic location based on information and/or data provided by the location determining component 14 or other device 10 elements.

The location determining component 14 is coupled with the processor 12 to facilitate determination of geographic locations including a current location of the device 10. The location determining component 14 is not required in all embodiments as the processor 12 may retrieve geographic information from other sources such as the user interface 18 or through internal data stored within the memory 16. However, the location determining component 14 is preferably coupled with the processor 12 to enable rapid and accurate geographic location determination.

The location determining component 14 is preferably a global positioning system (GPS) receiver, and is adapted to provide, in a substantially conventional manner 18, geographic location information for the device 10. The location determining component 14 may be, for example, a GPS receiver much like those disclosed in U.S. Pat. No. 6,434,485, which is incorporated herein by specific reference. However, the location determining component 14 may receive cellular or other positioning signals utilizing various methods to facilitate determination of geographic locations without being limited to GPS.

The location determining component 14 may include various processing and memory elements, including one or more processors or memory elements, to determine the geographic location of the device 10 or it may provide information and data to the processor 12 to enable the processor 12 to specifically determine the geographic location of the device 10. Thus, the location determining component 14 need not itself calculate the current geographic location of the device 10 based upon received signals. The location determining component 14 also may include an antenna for receiving signals, such as a GPS patch antenna or helical antenna Further, the location determining component 14 may be integral with the processor 12 and/or memory 16 such that the location determining component 14 may be operable to specifically perform the various functions described herein, including steps 100-110. Thus, the processor 12 and location determining component 14 need not be separate or otherwise discrete elements.

The memory 16 is coupled with the processor 12 and/or other device 10 elements and is operable to store various data utilized by the processor 12 and/or other elements. The memory 16 may include removable and non-removable memory elements such as RAM, ROM, flash, magnetic, optical, and/or other conventional memory elements. Further, the memory 16 may comprise a portion of the user interface 18 to enable the user to provide information to the device 10 via the memory 16, such as by inserting flash or other removable memory into the device 10 to provide information and instruction to the device 10. Also, the memory 16 may be integral with the processor 12, such as in embodiments where the memory 16 comprises internal cache memory or other memory included within the processor 12.

The memory 16 preferably includes various data associated with operation of the device 10, such as a computer program or other data for instructing the processor 12 and other device 10 elements to perform the steps described below. Further, the memory 16 preferably includes various cartographic data corresponding to thoroughfares, routes, terrain, and other general navigation data to facilitate the various navigation functions provided by the device 10 including route calculation. Additionally, the memory 16 may include stored destinations, destination addresses, and previously calculated or otherwise acquired routes to various destinations or destination addresses for later retrieval by the processor 18.

The user interface 18 enables users, third parties, or other devices to share information with the device 10. Thus, the user interface 18 is generally associated with the housing 26, such as by physical connection through wires, etc, or wirelessly utilizing conventional wireless protocols. Thus, the user interface 18 need not be physically coupled with the housing 26.

The user interface 18 may comprise one or more functionable inputs such as buttons, switches, scroll wheels, etc, a touch screen associated with the display 22, voice recognition elements, pointing devices such as mice, touchpads, trackballs, styluses, combinations thereof, etc. Further, the user interface 18 may comprise wired or wireless data transfer elements such as removable memory including the memory 16, network connections, data transceivers, etc, to enable the user and other devices or parties to remotely interface with the device 10.

Further, the user interface 18 is preferably operable to provide various information to the user utilizing the display 22 or other visual or audio elements such as a speaker. Thus, the user interface 18 enables the user and device 10 to exchange information relating to the device 10, including configuration, preferences, route information, points of interests, navigation information, waypoints, a destination address or destination, etc.

The single detour input 20 is a single input that is operable to provide a detour request when functioned. The detour input 20 may be integral with the user interface 18 such that the detour input 20 comprises a portion of the user interface 18, such as a particular button, switch, selectable input, voice command, etc, or the detour input 20 may be discrete, non-integral, or otherwise separate from the user interface 18.

Thus, the detour input 20 may be functioned by depressing or selecting a switch or button, issuing a voice command, selecting a portion of a touch screen, etc.

Preferably, the detour input 20 comprises a depressible input, such as a button or switch, coupled with the housing 26 to enable the detour input 20 to be easily functioned by a user while in transit. For example, the detour input 20 may be positioned on a front of the housing 26 or other user-reachable location to enable the user to quickly depress the detour input 20 once to provide the detour request while driving without endangering the user's safety or consuming excess time by requiring multiple data entries or other navigation information.

The display 22 is coupled with the processor 12 and/or other device 10 elements and is operable to display various information corresponding to the device 10, such as route information, as is described below. The display 22 may comprise conventional black and white, monochrome, or color display elements including CRT, TFT, and LCD devices. Preferably, the display 22 is of sufficient size to enable the user to easily view the display 22 to receive presented information while in transit. Further, as described above, the display 22 may comprise a portion of the user interface 18, such as in embodiments where the display 22 is a touch-screen display to enable the user to interact with the display 22 by touching or pointing at display areas to provide information to the device 10.

The power source 24 is associated with the housing 26 to provide electrical power to various device 10 elements. For example, the power source 24 is preferably directly or indirectly coupled with the user interface 18, single detour input 20, location determining component 14, processor 12, memory 16, and/or display 22. The power source 24 may comprise conventional power supply elements, such as batteries, battery packs, etc. The power source 24 may also comprise power conduits, connectors, and receptacles operable to receive batteries, battery connectors, or power cables. For example, the power source 24 may include both a battery to enable portable operation and a power input for receiving power from an external source such an automobile.

The housing 26 may be handheld or otherwise portable to facilitate transport of the device 10 between locations. Preferably, the housing 26 is suitable for mounting or coupling with an automobile to enable the device 10 to be utilized while in transit. Thus, the housing 26 may be configured for mounting within or on an automobile in a generally conventional manner and may comprise generally conventional and durable materials, such as ABS, plastics, metals, etc, to protect the enclosed and associated elements.

Figure 5:
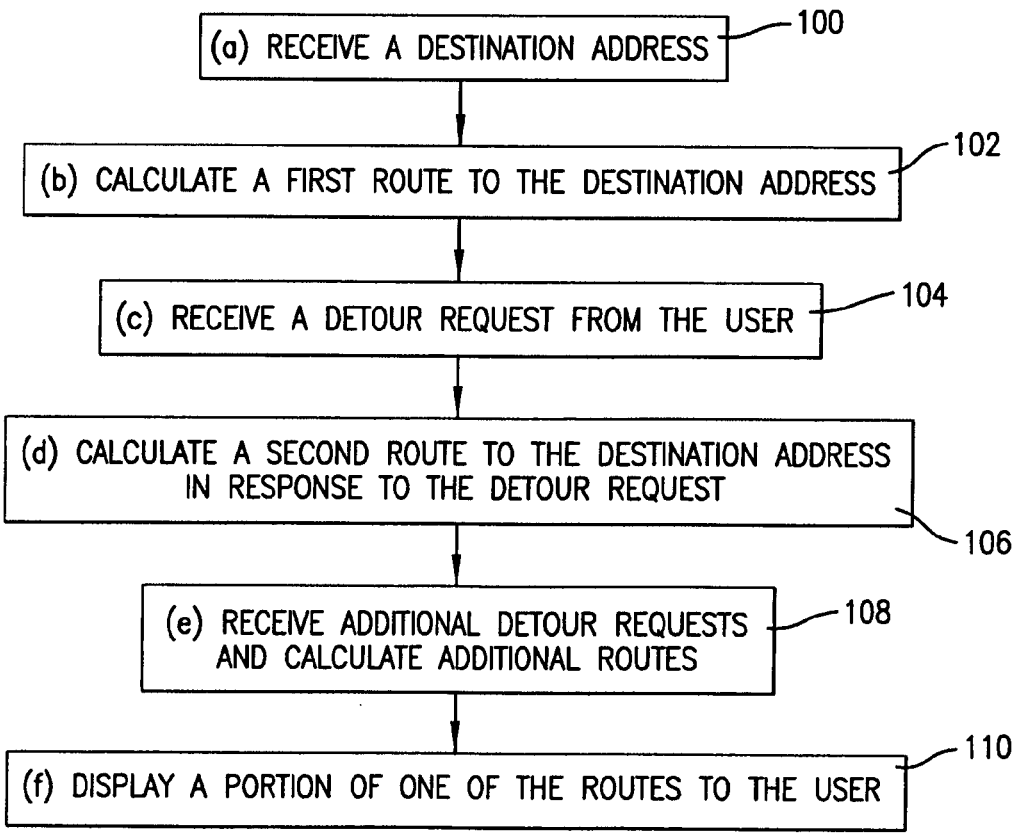
FIG. 5 is a flow chart showing some of the steps that may be performed by the navigation device of FIGS. 1-4.

Steps 100-110 shown in FIG. 5 generally illustrate the preferred operation of the device 10 which generally includes the steps of: (a) receiving a destination, referenced at step 100; (b) calculating a first route to the destination, referenced at step 102; (c) receiving a detour request from the user, as shown in step 104; (d) calculating a second detour route to the destination in response to the detour request, referenced at step 106; (e) receiving additional detour requests and calculating additional routes, referenced at step 108; and (f) displaying a portion of one of the routes to the user, referenced at step 110. The method described herein may be utilized manually by a user or in combination with any device such that utilization of the device 10 is not necessarily required.

Steps 100-110 may be performed in any order and are not limited to the ordering described herein. Further, steps 100-110 may be performed simultaneously or concurrently such that the steps need not be performed sequentially. For example, step 110 may be performed concurrently with steps 100-108 such that a route may be always displayed to facilitate navigation.

In step 100, the device 10 receives the destination. The destination represents a desired travel destination or intermediate waypoint, such as a city, location, attraction, point of interest, mailing address, street address, street, intersection, etc. Thus, the destination need not be limited to a mailing address.

The user may utilize the user interface 18 to provide the destination to the device 10. For example, the user may type the destination into a keypad, speak the destination, point to the destination on a touch screen, select the destination from a menu, etc. Further, the user may provide the destination to the device 10 through the user interface 18 by providing data corresponding to the destination utilizing wired or wireless data transfer methods, including providing the destination to the memory 16 for access by the device 10. Additionally, the device 10 may receive a previously stored destination from the memory 16 or through a wired or wireless data link, or the device 10 may receive the destination from third parties or other devices through the user interface 18. Thus, the user is not necessarily required to directly provide the destination to the device 10.

In step 102, the device 10, specifically the processor 12, calculates a first route to the destination utilizing a current location of the device 10 and the destination received in step 100. The processor 12 may utilize a current location provided by the location determining component 14, calculate the current location based on data provided by the location determining component 14 as described above, and/or utilize a current location ascertained through other methods, such as by retrieving a current location from the user interface 18 or the memory 16.

The processor 12 preferably utilizes various routing algorithms and cartographic data stored within the memory 16 to calculate the first route through one or more thoroughfares, such as roads, streets, highways, interstates, etc. Various routing algorithms are known in the art and may be utilized by the device 10 to calculate the first route. Such routing algorithms generally determine an optimal route to a destination based on various logic and logic weighting assigned to thoroughfares between the current device location and the destination.

Figure 3:
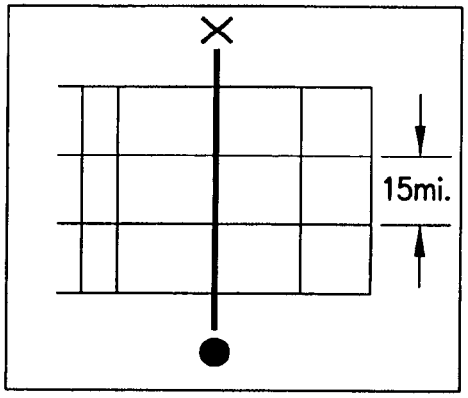
FIG. 3 is a schematic view showing an exemplary first route generated by the navigation device of FIGS. 1-2.

For example, high-speed thoroughfares are generally weighted differently than low-speed thoroughfares to provide preference to high-speed thoroughfares in traveling to a destination. Also, thoroughfares on the most direct route are similarly given preferential weighting during route calculations. Conventional routing algorithms generally analyze the various weighted thoroughfares to determine the optimal route to the destination. An exemplary first route is shown in FIG. 3 to illustrate an optimum route between a current location and a destination.

The device 10 may additionally or alternatively utilize various routing algorithms and related methods disclosed in U.S. Pat. No. 6,856,900, filed Nov. 21, 2003, and entitled "Systems, functional data, and methods for generating a route", which is incorporated herein by specific reference. However, the device 10 may calculate the first route utilizing any route generation method, including retrieving a previously calculated route from the memory 16 or utilizing a user or third-party route provided through the user interface 18, and is not limited to the specific methods disclosed herein.

The calculated first route generally includes a route through one or more thoroughfares to the destination that may be communicated to the user through the user interface 18, including the display 22, or stored within the memory 16 or otherwise transferred through the user interface 18. The route may be communicated to the user through visual or audio indicators, such as directions or a route illustrated on the display 22 or through audible directions to the destination.

In step 104, the device 10 receives the detour request from the user. Specifically, the user functions the detour input 20 to provide the detour request to the processor 12. Preferably, the user functions the detour input 20 once to provide the detour request. The user may desire to function the detour input 20 when travel conditions exist on the first route, including accidents, weather, or other delays, such that it is more desirable to travel on an alternate route. As described above, the detour input 20 may be functioned through various methods, including depressing a button, positioning a switch, issuing a voice command, selecting an area on the display, or otherwise utilizing the user interface 18.

Preferably, the detour input 20 comprises a single depressible input arranged on the housing 26 such that the user may easily and quickly depress the input to provide the detour request to the processor 12. Thus, the user is not required to provide additional information the user interface 18 or detour input 20, such as a delay length, detour length, delay time, preferred routes, etc, as merely functioning the detour input 20, such as by depressing the detour input 20 once, issuing a single voice command, or otherwise generating a single input once, provides the detour request to the processor 12.

Such operation is beneficial as it enables the user to provide the detour request without providing multiple and possibly complicated instructions or information to the device 10. For example, the user is not required to provide information corresponding to routes, delay information, or other related information, in order to provide the detour request. Instead, the user may function the detour input 20 once to enable the device 10 to automatically provide the detour request, and associated second detour route as described in step 106, without any further instruction by the user.

In step 106, the device 10 calculates a second detour route to the destination in response to the detour request. The second detour route represents a more efficient route to the destination in response to the detour request. Thus, the second detour route does not include at least a portion of the first route to circumvent the undesirable travel condition present on the first route that necessitated the detour request.

The processor 12 may calculate the second detour route in a generally similar manner to the first route calculation of step 102, with the exception that at least a portion of the first route is disfavored in the second detour route calculation such that the second detour route does not include at least a portion of the first route. For example, in routing algorithms that utilize logic weighting, a negative weight may be assigned to the thoroughfare currently traveled by the user and device 10 such that the device 10 will attempt to calculate the second detour route to avoid undesirable travel conditions on the currently traveled thoroughfare. Thus, the user is not required to specifically instruct the device 10 regarding the desired second detour route calculation.

Figure 4:
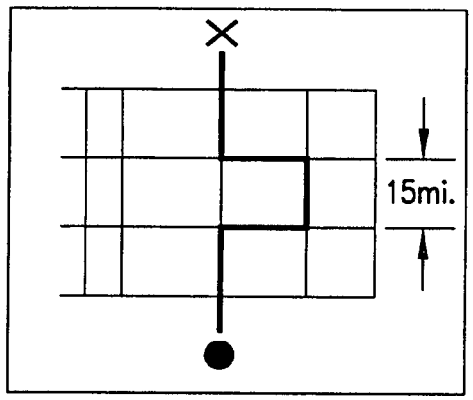
FIG. 4 is a schematic view showing an exemplary second detour route generated by the navigation device of FIGS. 1-3 in response to a detour request.

As shown in the exemplary second detour route of FIG. 4, the second detour route is preferably calculated to return to the first route after a dynamically calculated distance. Thus, the second detour route preferably deviates from the first route to avoid the travel condition that necessitated the detour request and then returns to the first route after the calculated distance.

The dynamically calculated distance preferably avoids most commonly encountered road conditions. Further, the calculation is such that a user need not be required to program, configure, or otherwise instruct the device 10 regarding the detour function and second detour route calculation. However, the dynamically calculated distance may comprise static distances or may be user-programmable or dynamically changeable to conform to various user requirements.

In a generally similar manner to the first route, the second detour route includes a route through one or more thoroughfares to the destination. The second detour route, in combination with the first route or separately from the first route, may be communicated to the user or other devices and parties through the user interface 18, including the display 22, or stored within the memory 16. Therefore, the route may be communicated to the user through visual or audio indicators, such as directions or a route illustrated on the display 22 or through audible directions to the destination.

In step 108, the device 10, specifically the processor 12, may receive one or more additional detour requests and calculate additional routes accordingly. Specifically, after functioning the single detour input 20 once, the second detour route will be calculated as described above in step 106. However, should the user encounter undesirable travel conditions on the second detour route, the user may again function the single detour input 20, preferably once, to cause the processor 12 to calculate a third route that does not include at least a portion of the second detour route.

For each subsequent detour request, the processor 12 preferably performs an additional route calculation as described above to generate the additional routes. For example, the processor 12 may assign various negative weighting to currently traveled thoroughfares to calculate a new route to circumvent both portions of the first route and the second detour route. Thus, subsequent routes may be nested within each other to return to the previous route after the dynamically calculated distance, the subsequent routes may return to the first route after the calculated distance has lapsed, and/or each detour request may reset the calculated distance such that the subsequent routes return to previous routes even after the original calculated distance for the first route has lapsed.

Additionally or alternatively, subsequent detour requests by the user may calculate the third route to immediately return the user to the first route such that the second detour route is no longer traveled. Such functionality may be beneficial in environments where limited alternative routes exist.

In step 110, at least a portion of one of the routes is displayed to the user utilizing the display 22. For example, various portions of the first route, second detour route, and/or additional routes may be presented on the display 22 to facilitate user navigation. Thus, the various calculated routes may be displayed separately or simultaneously by the display 22. Further, conventional visual and audio indicators, such as those discussed above or additional indicators such as information relating to the particular routes, the status of the detour, the length of the calculated distance remaining, the number of detours requested, the number of routes calculated, etc, may accompany the displayed routes to facilitate navigation.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

The invention claimed is:

1. A navigation device comprising:
   a processor operable to—
      determine a current geographic location of the device, receive a destination,
calculate a first route to the destination utilizing the current geographic location of the device and the received destination, and
calculate a second detour route to the destination, the second detour route not including at least a portion of the first route, each of the calculated routes including navigation instructions; and
a touch screen display coupled with the processor and operable to present visual representations of a single detour input and at least a portion of one of the calculated routes,
wherein a single selection of the single detour input on the touch screen provides a detour request to trigger the processor to calculate the second detour route and begin providing the corresponding navigation instructions without prompting for entry of route information relating to the first route or the second detour route.

2. The device of claim 1, further including a location determining component coupled with the processor to facilitate determination of the current location of the navigation device.

3. The device of claim 2, wherein the location determining component is operable to receive GPS signals.

4. The device of claim 1, wherein the processor calculates the second detour route to return to the first route after a dynamically calculated distance.

5. The device of claim 1, further including a user interface operable to receive information from the user including the destination.

6. The device of claim 1, further including a housing for housing the processor and the touch screen display.

7. The device of claim 1, further including a memory coupled with the processor for storing navigation information.

8. A navigation device comprising:
a processor operable to—
determine a current geographic location of the device,
receive a destination,
calculate a first route to the destination utilizing the current geographic location of the device and the received destination, and
calculate a second detour route to the destination, the second detour route not including at least a portion of the first route, each of the calculated routes including navigation instructions;
a location determining component coupled with the processor to facilitate determination of the current location of the navigation device;
a memory coupled with the processor, the memory operable to store navigation information; and
a touch screen display coupled with the processor and operable to present visual representations of a single detour input, at least a portion of one of the calculated routes, and the current geographic location of the device,
wherein a single selection of the single detour input on the touch screen provides a detour request to trigger the processor to calculate the second detour route and begin providing the corresponding navigation instructions without prompting for entry of route information relating to the first route or the second detour route.

9. The device of claim 8, wherein the processor calculates the second detour route to return to the first route after a dynamically calculated distance.

10. The device of claim 8, further including a housing for housing the location determining component, the processor, and the touch screen display.

11. A method of providing a route in response to a detour request, the method comprising the steps of:
receiving a destination;
calculating a first route to the destination utilizing a current geographic location of the navigation device and the received destination;
presenting on a touch screen display a single detour input;
receiving a detour request from a user by detecting when the user functions the single detour input once;
in response to detection of the detour request, calculating a second detour route including navigation instructions to the destination and begin providing the navigation instructions without prompting for entry of route information relating to the first route or the second detour route, the second detour route not including at least a portion of the first route; and
presenting at least a portion of the second detour route on the touch screen display.

12. The method of claim 11, wherein the second detour route returns the user to the first route after a dynamically calculated distance.

13. The method of claim 11, wherein the first route and second detour route each include a plurality of thoroughfares.

14. The method of claim 11, further including the steps of:
receiving a second detour request from the user, the second detour request consisting of the user functioning the single detour input once; and
calculating a third route to the destination in response to the second detour request, the third route not including at least a portion of the second detour route.

* * * * *